United States Patent [19]

Wisecarver

[11] Patent Number: 4,796,479
[45] Date of Patent: Jan. 10, 1989

[54] CLUTCH MECHANISM

[76] Inventor: Martin L. Wisecarver, 22032 Fallview La., Sonora, Calif. 95370

[21] Appl. No.: 68,111

[22] Filed: Jun. 30, 1987

[51] Int. Cl.⁴ .................... F16H 35/06; F16H 57/00; F16D 21/04
[52] U.S. Cl. ........................ 74/398; 74/396; 74/405; 192/20
[58] Field of Search ............... 192/20; 74/396, 398, 74/405, 410, 425, 392, 397, 354

[56] References Cited

U.S. PATENT DOCUMENTS

| 512,668 | 1/1894 | Smith | 74/396 |
|---|---|---|---|
| 1,262,235 | 4/1918 | Murray | 74/396 |
| 1,327,129 | 1/1920 | Wolff | 74/405 |
| 1,338,377 | 4/1920 | Kopf | 74/425 |
| 1,591,316 | 7/1926 | Iglauer | 74/396 |
| 2,771,169 | 11/1956 | Wahlstrom | 74/396 |
| 2,989,874 | 6/1961 | Johnson | 74/410 |
| 3,139,844 | 7/1964 | Landers | 74/405 |
| 3,705,518 | 12/1972 | Ernst et al. | 74/410 |
| 3,858,452 | 1/1975 | Gatland et al. | 74/405 |
| 4,683,770 | 8/1987 | Nettmann | 74/405 |

FOREIGN PATENT DOCUMENTS

| 643601 | of 0000 | France | 74/396 |
|---|---|---|---|
| 1357077 | 2/1964 | France | 74/405 |
| 548742 | 3/1977 | U.S.S.R. | 74/425 |

Primary Examiner—Dirk Wright
Assistant Examiner—Harold F. Macris
Attorney, Agent, or Firm—Phillips, Moore, Lempio & Finley

[57] ABSTRACT

A clutch mechanism for engaging and disengaging the thread (14) of a worm (13) from the teeth (17) of a worm gear (16). The worm (13) is mounted in a carrier block (47), disposed in a cavity (39) of a housing (12), from translatory movement towards and away from the worm gear. Springs (52) normally bias the worm away from engagement with the worm gear, while air pressure (34) is used to force the worm towards and into engagement with the worm gear. The cavity (39) and block (47) are tapered to prevent binding during movement of the block, and a spur gear drive is used to drive the worm (13) by motor (22), with the spur gears (18) and (19) being in mesh at all times during movement of the block (47).

17 Claims, 4 Drawing Sheets

CLUTCH MECHANISM

BACKGROUND OF THE INVENTION

The present invention relates generally to clutch mechanisms and more particularly to a clutch for engaging and disengaging a worm with and from a driven member such as a worm gear.

A worm drive has a number of advantages that can be of considerable utility in the functioning of an industrial robot. For example, a robot can be designed with a motor driven worm, with the driven member (such as a worm gear) being positively coupled to a tool for movement thereof. With the use of a control having a programmed sequence of commands, the motor can be driven in a sequence of desired directions and at desired speeds to cause the tool to be driven through a predetermined path of movement.

One advantage of a worm drive in such an application is that the positive, gear reduction character of the drive enables a relatively low torque and inexpensive motor to provide a considerable amount of force to the tool.

Another advantage of a worm drive is that the axes of the worm and worm gear are at right angles to each other so that the movement of the worm gear teeth is in a direction parallel to the axis of the worm. Thus, if any external force is exerted on the tool to move it from where it is, the force fed back to the worm gear will be applied to the thread of the worm in a direction parallel to the axis of the worm. Because of the relatively small pitch angle of the worm, very little radial force on the worm is required to hold the worm against the fed back axial force thereon.

At the same time, the ability of a worm drive to hold against external forces applied to the tool prevents the use of a worm drive in a manually teachable robot of the type wherein the tool is moved by hand through a desired path, with the sequential positions of the tool being used directly to make the program which will subsequently be used to move the tool through the desired path. In such an instance, the holding ability of a worm drive will prevent the tool from being moved by hand during the teach mode.

It is the primary object of the present invention to provide a clutch mechanism which can quickly and easily engage or disengage a worm and worm gear or other driven member. Such clutch mechanism, in a robot environment, will then enable the worm drive to be disengaged for manual movement of the tool in the teach mode and to be engaged for positive drive of the tool during the work mode.

SUMMARY OF THE INVENTION

In the main aspect of the present invention, a worm and a driven member are mounted for relative movement towards and away from each other. Means are provided for forcing the worm and driven member towards each other and into meshing engagement of the worm thread and the teeth of the driven member, and means are provided for urging the worm and driven member sufficiently apart from each other to disengage the worm thread and driven member teeth.

In a further aspect of the invention, the worm thread and driven member teeth are pointed to facilitate engagement thereof.

A yet further aspect of the invention is the provision of a tapered worm carrier operating in a tapered housing cavity to provide aligning engagement of the worm and driven member, and for non-jamming engagement and disengagement of the members.

Other aspects of the invention will become apparent in the course of the following detailed description.

BRIEF DESCRIPTION OF THE DRAWINGS

In the drawings, forming a part of this application, and in which like parts are designated by like reference numbers throughout the same.

DESCRIPTION OF THE PREFERRED EMBODIMENTS

Figure 1:
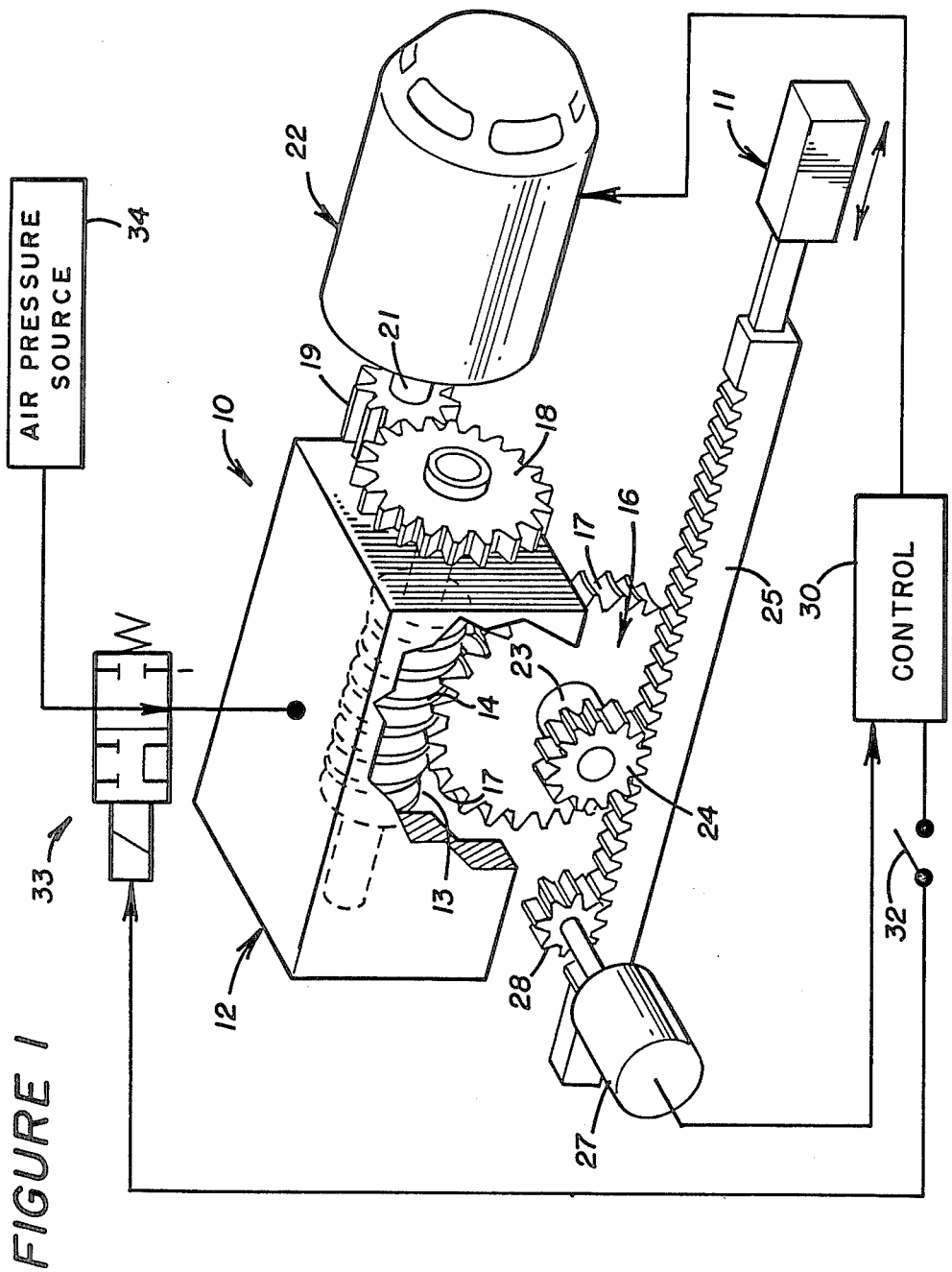
FIG. 1 is a generally diagrammatic illustration of a worm drive clutch mechanism constructed in accordance with the present invention and used in conjunction with a robot tool.

Referring now to the drawings, wherein are disclosed preferred embodiments of the invention, FIG. 1 illustrates a clutch mechanism 10 used in conjunction with a robot tool 11. In general, the clutch mechanism 10 includes a housing 12 in which are a rotatable worm member 13 having a thread 14 and a driven member 16 having teeth 17 meshingly engageable with the worm thread 14. As shown in the embodiment of FIGS. 1-7, the driven member 16 is in the form of a worm gear. The worm 13 is motor driven, by spur gears 18 and 19, spur gear 18 being mounted on worm 13 coaxially therewith, and spur gear 19 being fixed on the shaft 21 of dc motor 22.

In use with a robot tool, the output shaft 23 of the worm gear 16 may have a pinion gear 24 mounted thereon and in meshed engagement with an elongated rack 25 which carries the tool 11. A position sensor 27, having a pinion 28 meshed with rack 25, provides continuous information as to the location of the tool 11 in its path of movement, which in this case is purely linear as indicated by arrow 29. The position information from sensor 27, which may be in the form of a multi-turn potentimeter, is continuously fed to control 30.

In the "teach" mode, switch 32 is closed, to energize solenoid valve 33, allowing the interior of housing 12 to be vented, as more fully described below, so that the worm and worm gear move apart from each other to disengage the worm thread and worm gear teeth. The tool 11 can now be moved easily by hand through its path to the various desired sequential positions, with the sensor 27 providing the position information which is stored in control 30 in the form of a real time map. When the teach mode is complete, switch 32 is opened, so that solenoid valve 33 will move to connect the air pressure source 34 to housing 12. Again, as more fully described below, pressurization of housing 12 will cause the worm 13 and worm gear 16 to re-engage. With control 30 in its "work" mode, the dc motor 22 will be energized from the control in accordance with the map programmed therewith. Sensor 27 will continue to provide the control with information as to the actual position of tool 11 to enable the control to determine that the tool is where it should be.

The details of the clutch mechanism 10 are best shown in FIGS. 2-6. The housing 12 includes an upper case member 36 having internal side walls 37 and end walls 38 all of which slope downwardly and inwardly to form a tapered cavity 39 which is rectangular in horizontal cross-section. A thin shim 41, sandwiched between the upper case member 36 and of the lower case member 42, forms the bottom of cavity 39. The upper end of the cavity 39 is closed by resilient diaphragm 43 which is confined between the upper case member 36 and cover plate 44. A suitable fitting 46 is mounted on the cover plate 44 for connection of the interior of housing 12 to the air pressure source 34.

A tapered carrier block 47 is disposed in cavity 39, block 47 having side walls 48 and end walls which slope downwardly and inwardly and conform to the taper of cavity 39. When the tapered block 47 is in the bottom of cavity 39, with the lower surface 51 of the block resting on the upper surface of shim 41 the block 47 will fit snugly against the walls of cavity so that the block 47 cannot move laterally relative to the housing 12. The shim 41 has a thickness which is selected to give a desired spacing between the axes of worm 13 and worm gear 16 so that the worm and worm gear will be properly engaged with each other when the carrier block 47 is bottomed in cavity 39. The use of shim 41 enables the upper and lower case members 36 and 42 to be inexpensively manufactured, as by casting, with an inexpensive flat shim 41 of close tolerance thickness material with the proper thickness being then used to provide the precise distance desired between the worm and worm gear axes. Also, as the worm and/or worm gear wear over time, shim 41 may be replaced with a thinner shim which will provide for proper gear engagement, rather than replacing the much more expensive worm or worm gear. Thus, the shim 41 provides an inexpensive means for adjusting the distance between the axes of the worm 13 and worm gear 16.

Figure 3:
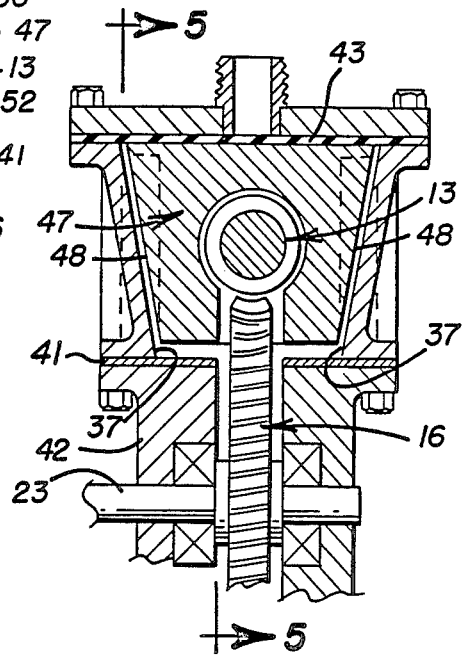
FIG. 3 is a partial view, taken as in FIG. 2, showing the worm and driven member disengaged.
Figure 5:
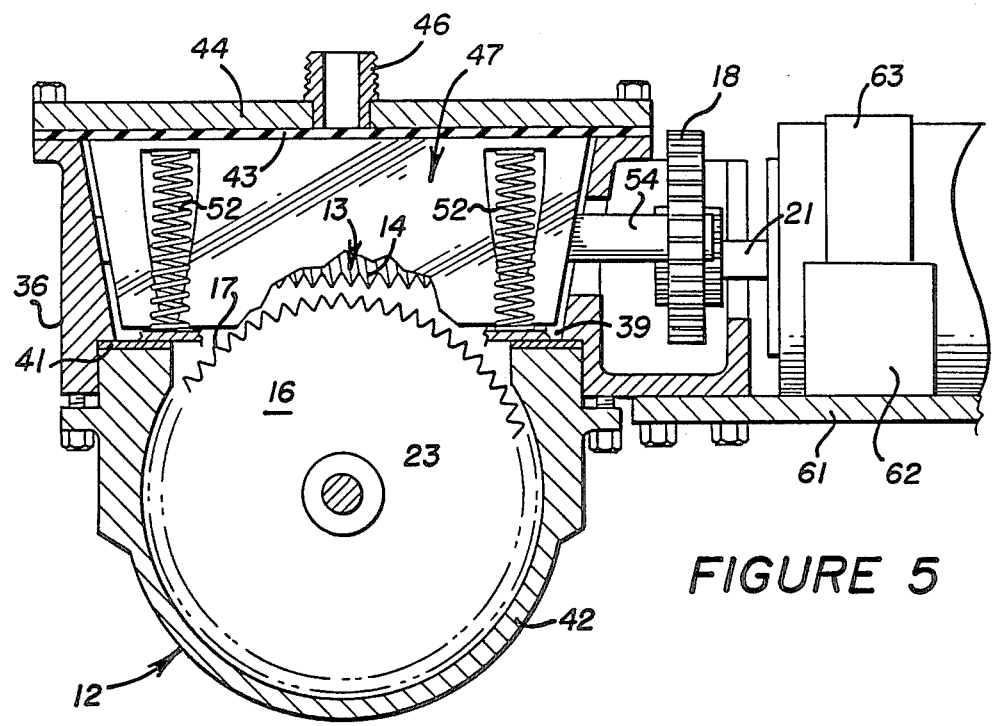
FIG. 5 is a sectional view, taken on line 5—5 of FIG. 3, with the worm and driven member disengaged from each other.

Four springs 52 are provided, acting between opposed support surfaces on the upper case member 36 and block 47, to urge the block 47 upwardly in the cavity 39 to the position shown in FIGS. 3 and 5.

The tapered block 47 has a horizontal bore therethrough from end to end to accommodate the worm 13 therein. Radial bearings 53 are provided at the ends of the worm shaft 54 to support the worm for rotation in block 47. Thrust bearings 56 are also provided at each end of the worm, the thrust bearings being pre-loaded by adjustable nut 57 to prevent axial movement of worm 13 relative to carrier block 47.

Worm shaft 54 extends through an elongated slot 58 in the end wall of the upper case member 36 and has spur gear 18 fixed to its end. As mentioned previously, spur gear 18 meshes with spur gear 19 on shaft 21 of motor 22. Motor 22 is fixed relative to housing 12, as for example by the bracket 61, yoke 62 and strap 63.

In operation of the mechanism thus far described, when the source of air pressure 34 is not connected to housing 12, the springs 52 will urge the block 47 and worm 13 to its upper position (FIGS. 3 and 5) wherein the worm thread 14 and worm gear teeth 17 are completely out of engagement with each other. In this declutched position the worm gear 16 is free to rotate so that the tool 11 and rack 25 may be manually moved.

Figure 2:
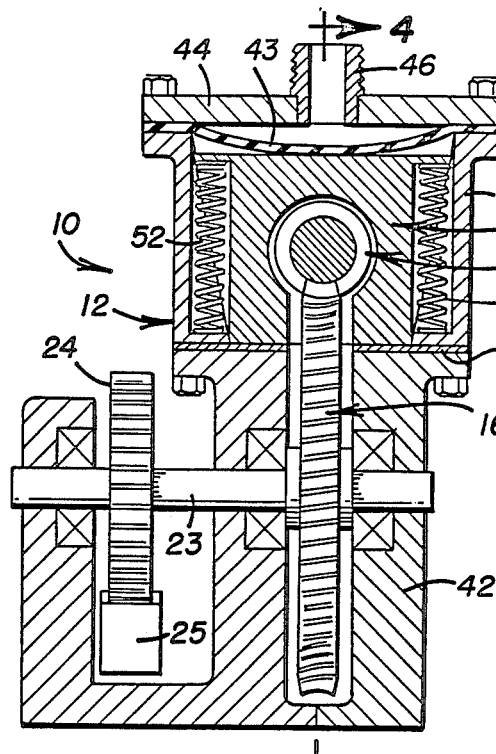
FIG. 2 is a sectional view of a worm drive clutch mechanism constructed in accordance with the present invention, taken on line 2—2 of FIG. 4 and taken crosswise of the worm, illustrating the positions of the parts when the worm and driven member are engaged.
Figure 4:
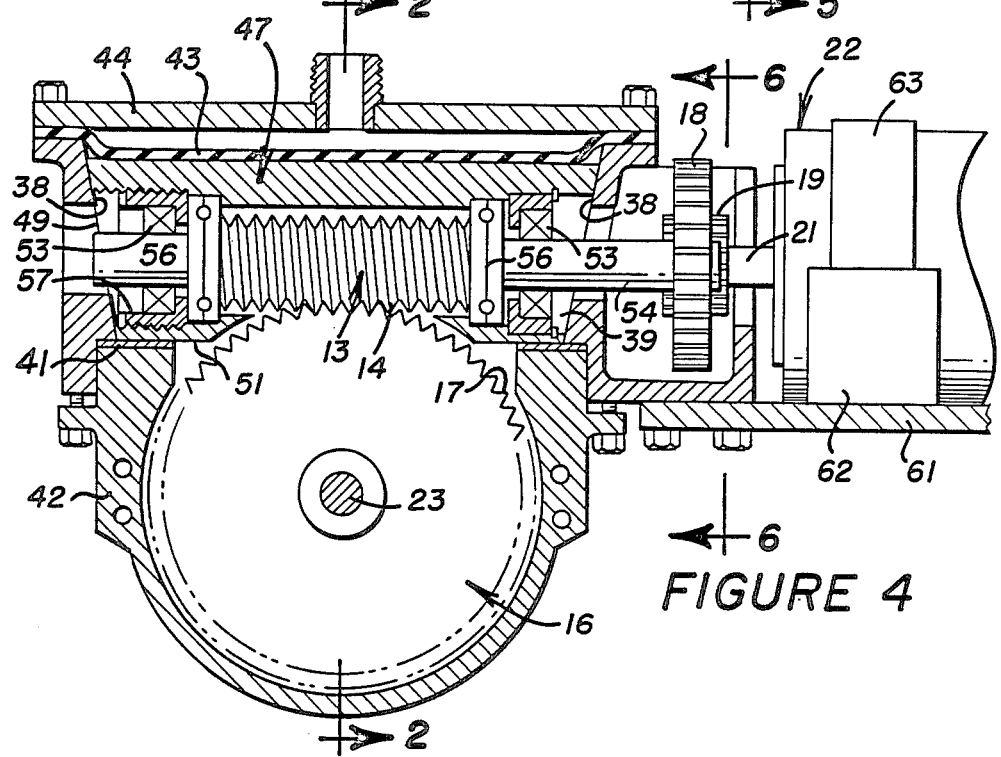
FIG. 4 is a sectional view, taken on line 4—4 of FIG. 2, showing the worm and driven member engaged with each other.

When it is desired to engage the worm and worm gear, air pressure is applied through fitting 46 into the housing to act downwardly on diaphragm 43. With the pressure from air pressure source 34 being sufficient to overcome the force of the springs 52, the diaphragm 43 will press down on block 47 and move the worm in a generally translatory manner down to its lowermost position, wherein the worm thread is fully engaged with the worm gear teeth (FIGS. 2 and 4). The air pressure will then hold the worm in driving engagement with the worm gear 16, the air pressure being also sufficiently high so as to withstand the driving force of the worm on the worm gear which would tend to force them apart.

Because of the tapered shape of the cavity 39 and carrier block 47, the block will not bind in the cavity as it moves downwardly even though the block 47 may tilt somewhat during such movement.

When it is desired to disengage the worm from the worm gear, the air pressure is removed and the housing above the diaphragm 43 is vented. The springs 52 will quickly move block 47 upwardly. Again, because of the tapered shape of the cavity and block, the block will not bind in the cavity even though the block may tilt somewhat as it moves upwardly.

Figure 6:
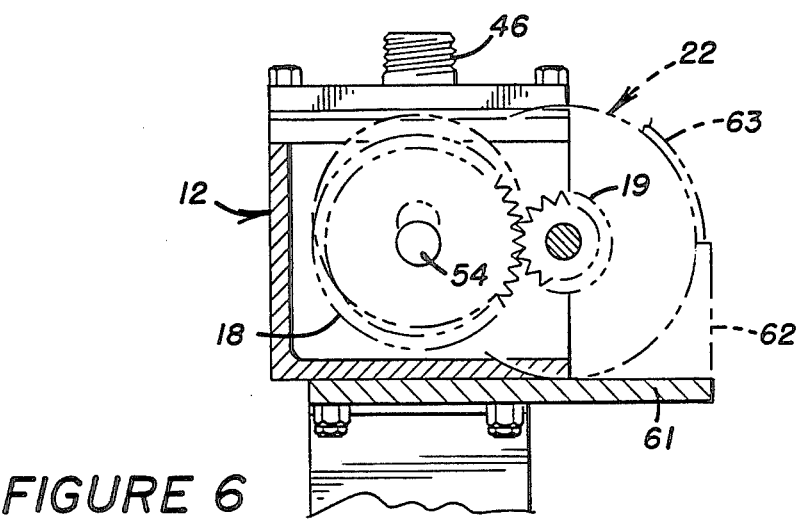
FIG. 6 is a sectional view, taken on line 6—6 of FIG. 4, illustrating the drive connection between the motor and worm.

As illustrated in FIG. 6, when the worm is in its lowest and fully engaged position, the spur gear 18 on worm shaft 54 will be in its lowest position, shown in full lines, and will be fully engaged with the spur gear 19 on motor 22. The teeth of the spur gears 18 and 19 will be cut deep enough so that when the worm 13 has moved to its upper position, shown in broken lines, the spur gears 18 and 19 will remain engaged, although loosely, with each other. Thus, although the worm 13 will move in and out of engagement with the worm gear 16, the worm is continuously driven by motor 22, so that there is no problem of engaging and disengaging the drive gears 18 and 19. The loose engagement of the drive gears 18 and 19, when the worm and worm gear are disengaged, will not be disadvantageous because there is no load on the worm at such time.

Figure 7:
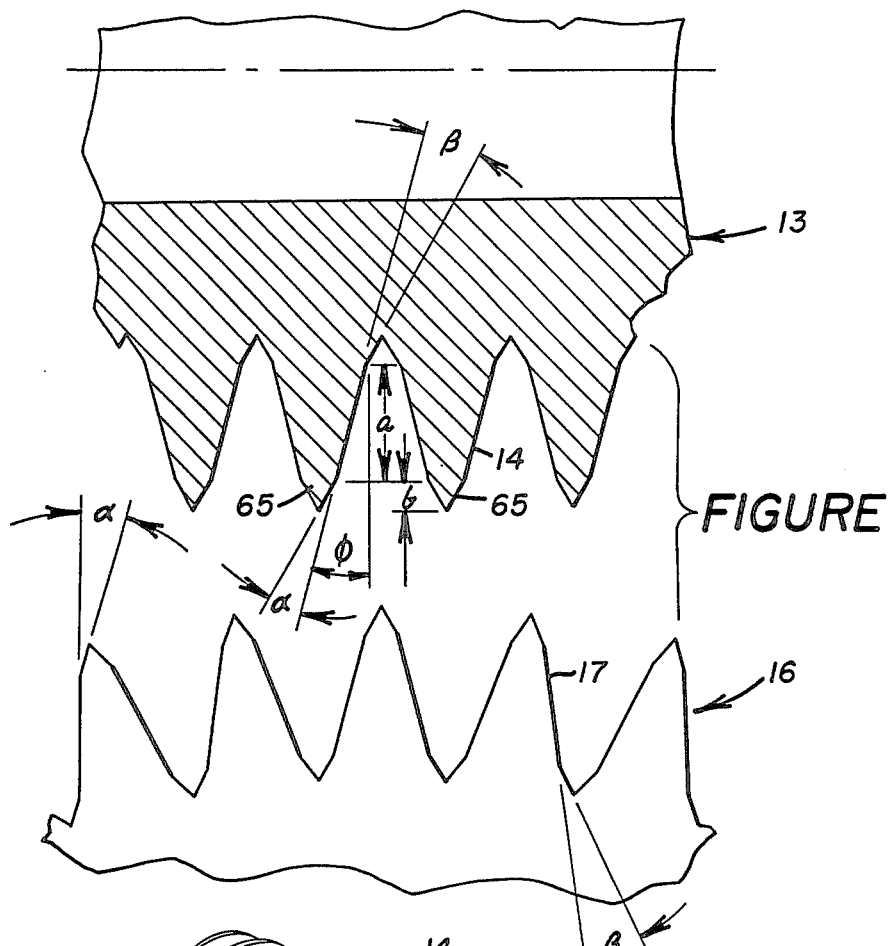
FIG. 7 shows enlarged details of the worm thread and driven member teeth.

In order to aid in the engagement of the worm thread 14 with the worm gear teeth 17, the worm thread and worm gear teeth are pointed, preferably as shown in FIG. 7. In FIG. 7, the worm 13 has a thread with a standard pressure angle $\phi$ of $141\frac{1}{2}°$. A standard worm thread would have a working depth "a" (the addendum plus the dedendum, measured from the usual flat top land of the thread). In the present clutch mechansim, instead of having a flat top land, the thread is pointed, with the pointed portion 65 having a height "b" which is about 18% of "a" and with the extending surface of the pointed portion being at an angle $\alpha$ to the pressure surface of about 14°. The worm gear teeth 17 are similarly pointed. The roots of the worm thread and worm gear teeth are cut away, preferably at an angle $\beta$ of about $14\frac{1}{2}°$, to allow the pointed teeth to engage with each other.

The pointing of the worm thread and worm gear teeth will aid in causing the least amount of relative rotational movement between the worm and worm gear during engagement and disengagement. In addition, the pointing of the thread and teeth will assure that there is no jamming of the members as they engage each other, as could be the case if conventional flat top lands were provided.

Figure 8:
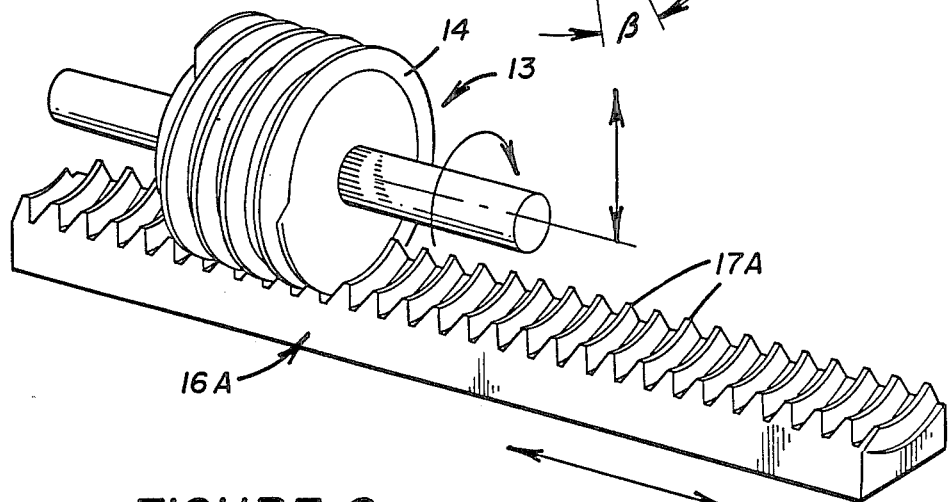
FIG. 8 illustrates an alternative embodiment of the invention wherein the driven member is in the form of a rectilinear rack.

FIG. 8 illustrates another embodiment of the invention, wherein the driven member 16A is a rectilinear rack having teeth 17A complimentary to the shape of the worm thread 14. In this form of the invention the worm 13 will produce linear motion of the driven member 16A, instead of rotary motion as with a worm gear. As before, relative translatory movement of the worm and driven member apart from each other or towards each other will cause clutching disengagement and re-engagement of the members.

Preferably, the worm 13 would be mounted for translatory movement in a manner as described in connection with FIGS. 2–6. If such apparatus is used, the worm gear 16 would be removed, and replaced by rack 16A, with suitable modification of the lower case member to permit the rack 16A to project therethrough and to hold the rack 16A against movement in a direction normal to its length.

The foregoing description of preferred embodiments has been presented for purposes of illustration and description. It is not intended to be exhaustive or to limit the invention to the precise forms described, and obviously many modifications and variations are possible in light of the above teaching. The embodiments were chosen in order to best explain the principles of the invention and its practical application to thereby enable others in the art to best utilize the invention in various modifications as are suited to the particular use contemplated. Although the above description is directed to the use of the clutch mechanism in a robot environment, such description is merely explanatory and the clutch mechanism can be used for other applications wherein it is desired to engage and disengage a worm and a driven member.

I claim:

1. A clutch mechanism comprising:
   (a) a rotatable worm member having a thread,
   (b) a driven member having teeth meshingly engageable with the thread of said worm member,
   (c) mounting means mounting said worm member and said driven member for relative movement of said members towards and away from each other,
   (d) spring means acting upon said worm and driven members to bias said members apart from each other,
   (e) a source of air pressure,
   (f) a pressure actuated device acting upon said worm and driven members to force said members towards each other with a force greater than that of said spring means when said pressure actuated device is connected to said source of air pressure,
   (g) means for alternatively connecting said pressure actuated device to said source of air pressure or for venting said pressure actuated device, and
   (h) driving means for rotatably driving said worm member.

2. A clutch mechanism as set forth in claim 1, wherein said driven member is a worm gear.

3. A clutch mechanism as set forth in claim 1, wherein said driven member is a linear rack.

4. A clutch mechanism as set forth in claim 1, wherein said thread and teeth are pointed.

5. A clutch mechanism as set forth in claim 1,
   wherein said mounting means includes means for allowing said worm to move in a generally translatory movement between a first position wherein said thread of said worm and said teeth of said driven member are in engagement with each other and a second position wherein said worm and teeth are fully disengaged from each other, and
   wherein said driving means includes a first spur gear rotatably about a fixed axis, a motor driving said first spur gear, and a second spur gear connected to said worm axially thereof, said first and second spur gears being fully meshed when said worm is in its first position and loosely meshed when said worm is in its second position.

6. A clutch mechanism as set forth in claim 5, wherein said thread and teeth are pointed.

7. A clutch mechanism as set forth in claim 1, wherein said mounting means includes:
   a housing having an internal cavity with a generally rectangular bottom and walls extending upwardly from said bottom, said walls of said cavity diverging away from each other in a direction away from the bottom of said cavity,
   a block disposed in said cavity and having a bottom engageable with the bottom of said cavity, said block being movable in said cavity towards and away from the bottom of said cavity, said block having tapered sides complementary to the walls of said cavity, and wherein said block closely fits against the walls of said cavity when said block is bottomed in said cavity, said worm being rotatably mounted in said block with the axis of said worm being generally parallel with the bottom of said block,
   means mounting said driven member for movement of the teeth thereof along a path fixed relative to said housing,
   said housing and block each having openings enabling the teeth of said driven member to project through said openings and into meshing engagement with the thread of said worm member.

8. A clutch mechanism as set forth in claim 7, wherein said thread and teeth are pointed.

9. A clutch mechanism as set forth in claim 7,
   wherein said block is movable in said housing cavity between a first position wherein said thread of said worm and said teeth of said driven member are in engagement with each other and a second position wherein said worm and teeth are fully disengaged from each other, and
   wherein said driving means includes a first spur gear rotatable about a fixed axis relative to said housing, a motor driving said first spur gear, and a second spur gear connected to said worm axially thereof, said first and second spur gears being fully meshed when said block is in its first position and loosely meshed when said block is in its second position.

10. A clutch mechanism as set forth in claim 9, wherein said thread and teeth are pointed.

11. A clutch mechanism comprising:
    (a) a rotatable worm member having a thread,
    (b) a driven member having teeth meshingly engageable with the thread of said worm member,
    (c) a housing having an internal cavity with a generally rectangular bottom and walls extending upwardly from said bottom, said walls of said cavity diverging away from each other in a direction away from the bottom of said cavity, (d) a block disposed in said cavity and having a bottom engageable with the bottom of said cavity, said block being movable in said cavity towards and away from the bottom of said cavity, said block having tapered sides complementary to the walls of said cavity, and wherein said block closely fits against the walls of said cavity when said block is bottomed in said cavity, said worm being rotatably mounted in said block with the axis of said worm being generally parallel with the bottom of said block, (e) means mounting said driven member for movement of the teeth thereof along a path fixed relative to said housing, (f) said housing and block each having openings enabling the teeth of said driven member to project through said openings and into meshing engagement with the thread of said worm member, (g) forcing means for forcing said worm member and said driven member towards each other and into meshing engagement of said thread and teeth, (h) urging means for urging said worm member and said driven member sufficiently apart for each other to disengage said thread and teeth, (i) driving means for rotatably driving said worm member.

12. A clutch mechanism as set forth in claim 11, wherein said driven member is a linear rack.

13. A clutch mechanism as set forth in claim 11, wherein said thread and teeth are pointed.

14. A clutch mechanism as set forth in claim 11, wherein said block is movable in said housing cavity between a first position wherein said thread of said worm and said teeth of said driven member are in engagement with each other and a second position wherein said worm and teeth are fully disengaged from each other, and wherein said driving means includes a first spur gear rotatable about a fixed axis relative to said housing, a motor driving said first spur gear, and a second spur gear connected to said worm axially thereof, said first and second spur gears being fully meshed when said block is in its first position and loosely meshed when said block is in its second position.

15. A clutch mechanism as set forth in claim 14, wherein said thread and teeth are pointed.

16. A clutch mechanism comprising:

(a) a rotatable worm member having a thread, (b) a driven member having teeth meshingly engageable with the thread of said worm member, (c) mounting means mounting said worm member and said driven member for relative movement of said members towards and away from each other between a first position wherein said thread of said worm and said teeth of said driven member are in engagement with each other and a second position wherein said worm and teeth are fully disengaged from each other, (d) forcing means for forcing said worm member and said driven member towards each other and into meshing engagement of said thread and teeth, (e) urging means for urging said worm member and said driven member sufficiently apart for each other to disengage said thread and teeth, (f) driving means for rotatably driving said worm member, said driving means including a first spur gear rotatable about a fixed axis, a motor driving said first spur gear, and a second spur gear connected to said worm axially thereof, said first and second spur gears being fully meshed when said worm is in its first position and loosely meshed when said worm is in its second position.

17. A clutch mechanism as set forth in claim 16, wherein said thread and teeth are pointed.

* * * * *